(12) United States Patent
Takada

(10) Patent No.: US 12,056,272 B2
(45) Date of Patent: Aug. 6, 2024

(54) HEAD-MOUNTED DISPLAY APPARATUS, IMAGE DISPLAY SYSTEM, AND IMAGE DISPLAY METHOD TO DETERMINE MOUNTING DEVIATION

(71) Applicant: SONY GROUP CORPORATION, Tokyo (JP)

(72) Inventor: Masahiro Takada, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/756,250

(22) PCT Filed: Nov. 2, 2020

(86) PCT No.: PCT/JP2020/041057
§ 371 (c)(1),
(2) Date: May 19, 2022

(87) PCT Pub. No.: WO2021/106502
PCT Pub. Date: Jun. 3, 2021

(65) Prior Publication Data
US 2023/0004215 A1    Jan. 5, 2023

(30) Foreign Application Priority Data

Nov. 29, 2019   (JP) ................................. 2019-216423

(51) Int. Cl.
*G06F 3/01* (2006.01)
*G02B 27/01* (2006.01)

(52) U.S. Cl.
CPC ......... *G06F 3/012* (2013.01); *G02B 27/0179* (2013.01); *G06F 3/013* (2013.01);
(Continued)

(58) Field of Classification Search
CPC ..... G06F 3/012; G06F 3/013; G02B 27/0179; G02B 2027/0178; G02B 2027/0187
See application file for complete search history.

(56) References Cited

U.S. PATENT DOCUMENTS

2014/0002329 A1* 1/2014 Nishimaki .......... G06F 3/04815
                                                       345/8
2016/0035140 A1* 2/2016 Bickerstaff ........... G06T 19/006
                                                       345/633
(Continued)

FOREIGN PATENT DOCUMENTS

CN          105739095 A     7/2016
JP       2010-262232 A     11/2010
(Continued)

OTHER PUBLICATIONS

International Search Report and Written Opinion of PCT Application No. PCT/JP2020/041057, issued on Jan. 19, 2021, 09 pages of ISRWO.

*Primary Examiner* — Kwang-Su Yang
(74) *Attorney, Agent, or Firm* — CHIP LAW GROUP

(57) ABSTRACT

An object is to provide a head-mounted display apparatus that makes it possible to accurately determine a mounting deviation. The technology provides a head-mounted display apparatus including a sensor that detects a change in position of the head-mounted display apparatus relative to a head. The technology further provides an image display system including the head-mounted display apparatus and an information processor that sends image data to the head-mounted display apparatus. The technology further provides an image display method including a detection step of detecting the change in position of the head-mounted display apparatus relative to the head, and an adjustment step of adjusting a position to which the head-mounted display apparatus proj- (Continued)

ects image display light on the basis of the change in position detected in the detection step.

19 Claims, 7 Drawing Sheets

(52) U.S. Cl.
 CPC ........... *G02B 2027/0178* (2013.01); *G02B 2027/0187* (2013.01)

(56) References Cited

U.S. PATENT DOCUMENTS

| | | | |
|---|---|---|---|
| 2016/0187662 A1 | 6/2016 | Sato | |
| 2016/0269578 A1* | 9/2016 | Nozawa | G06T 11/60 |
| 2018/0140187 A1* | 5/2018 | Watanabe | G06V 40/19 |

FOREIGN PATENT DOCUMENTS

| | | |
|---|---|---|
| JP | 2014-179620 A | 9/2014 |
| JP | 2016-122177 A | 7/2016 |
| JP | 2017-135605 A | 8/2017 |

\* cited by examiner

[FIG. 1]
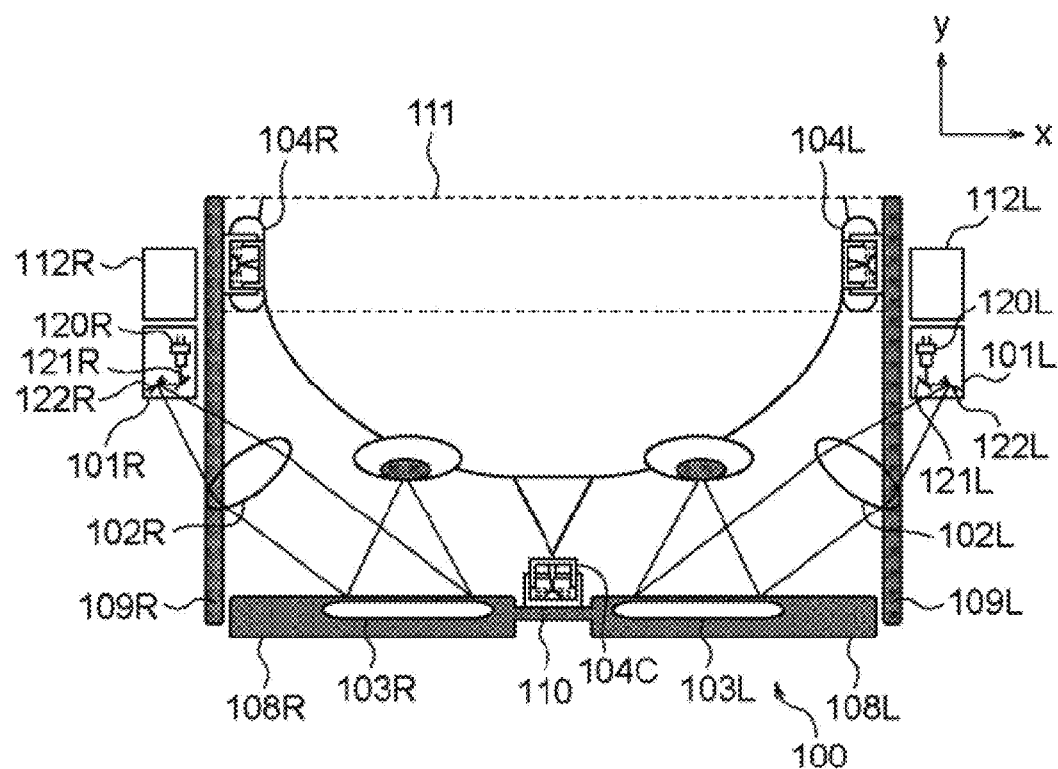
[FIG. 2]
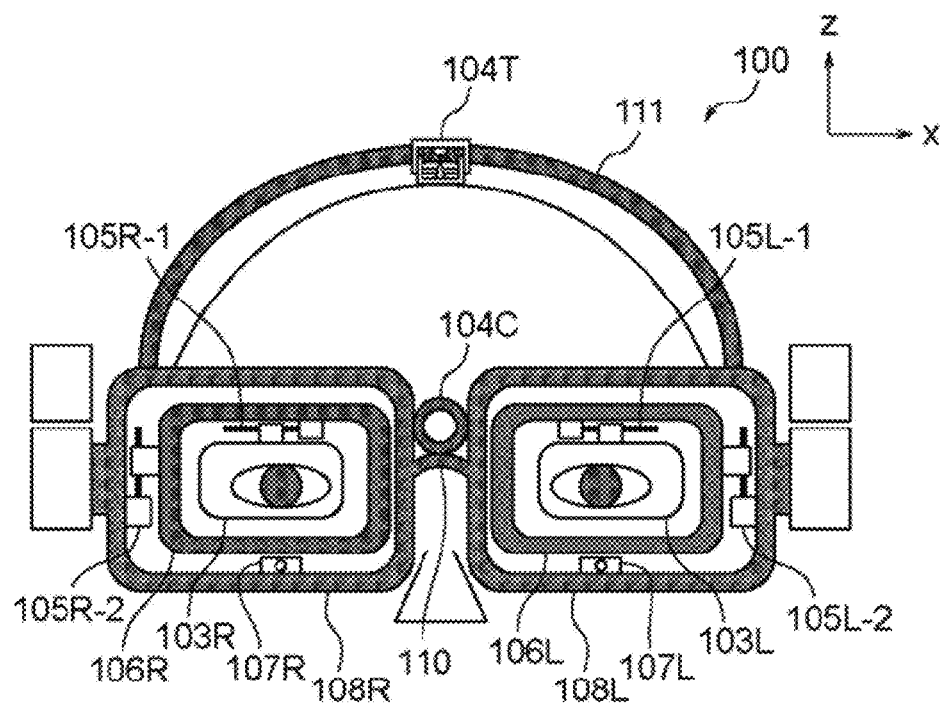

[FIG. 3]
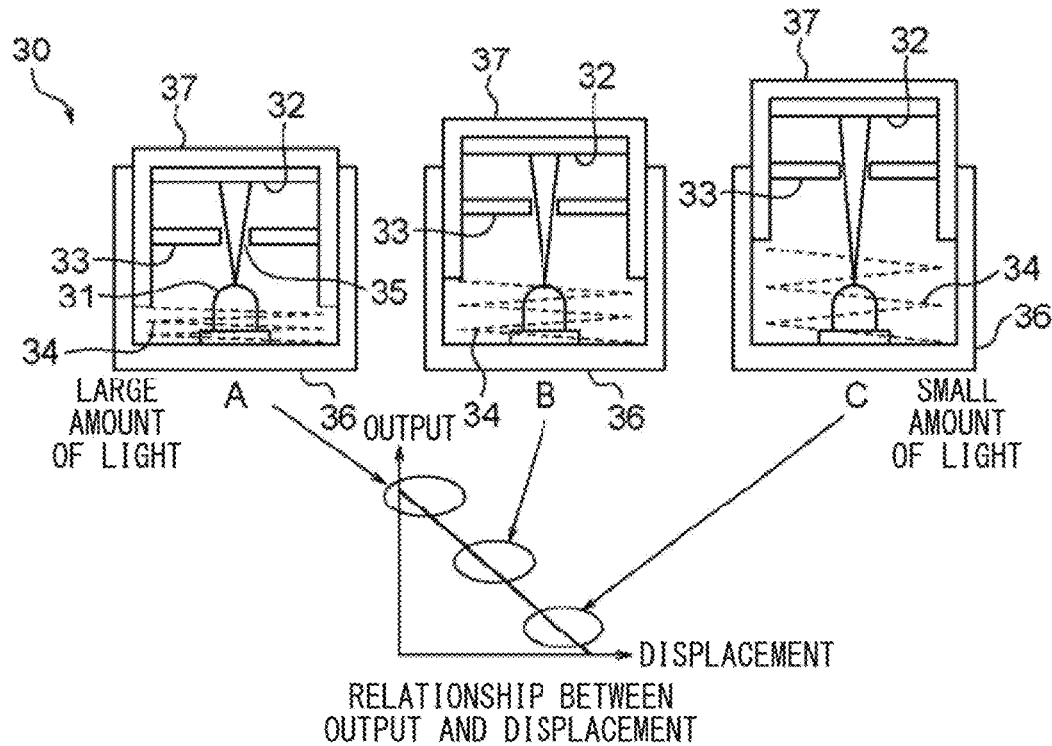
[FIG. 4]
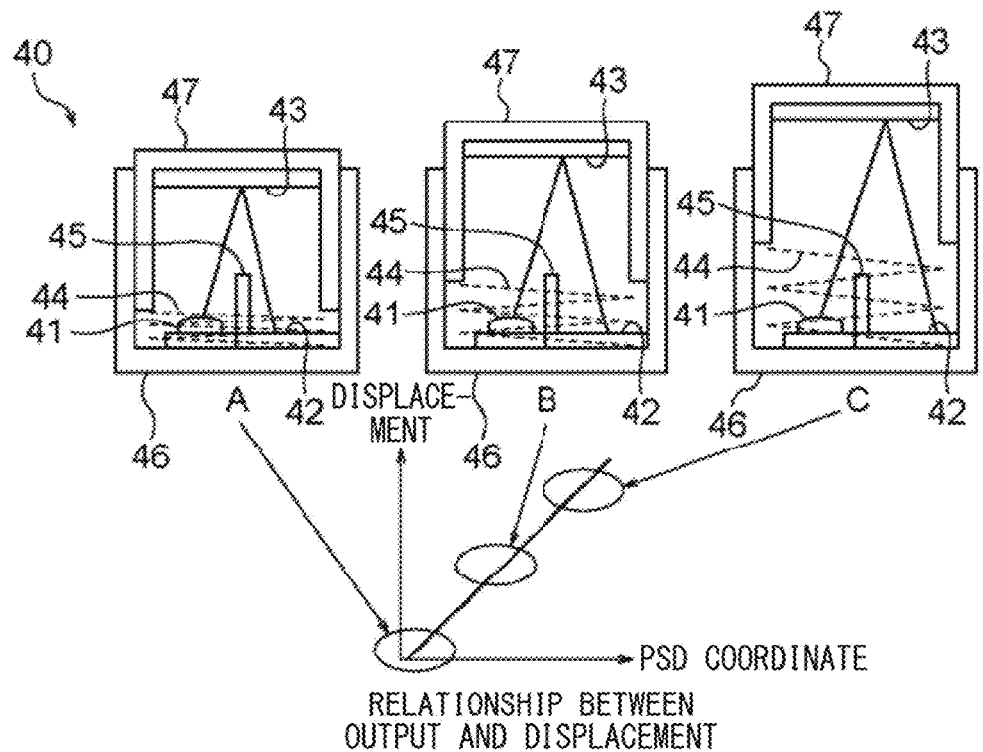

[FIG. 5]
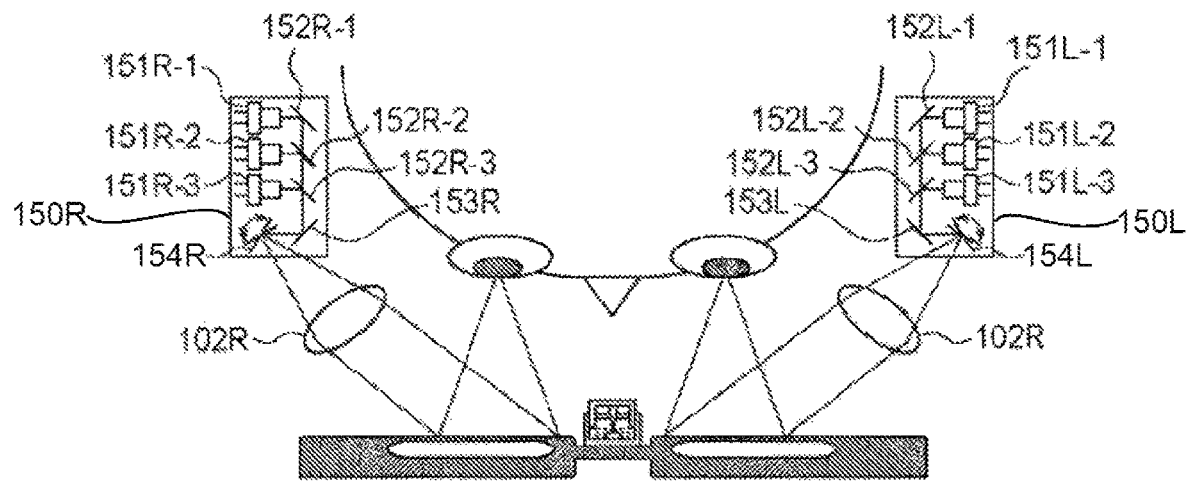
[FIG. 6]
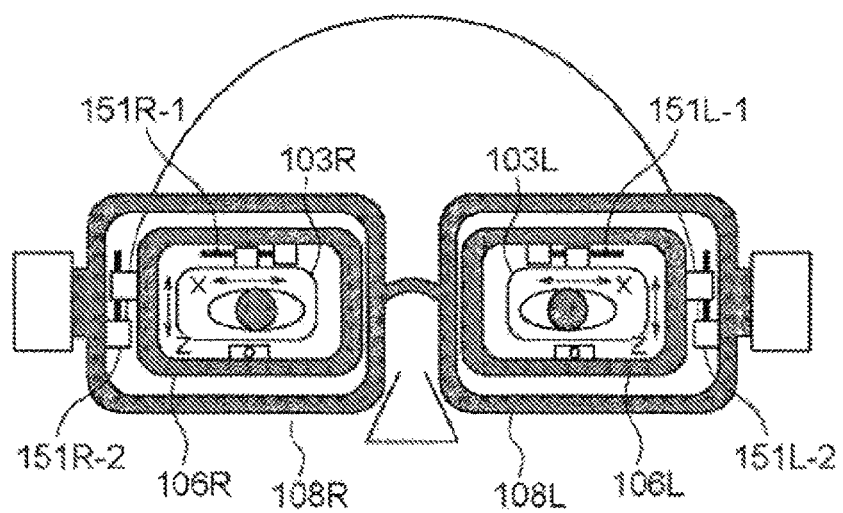

[FIG. 7]
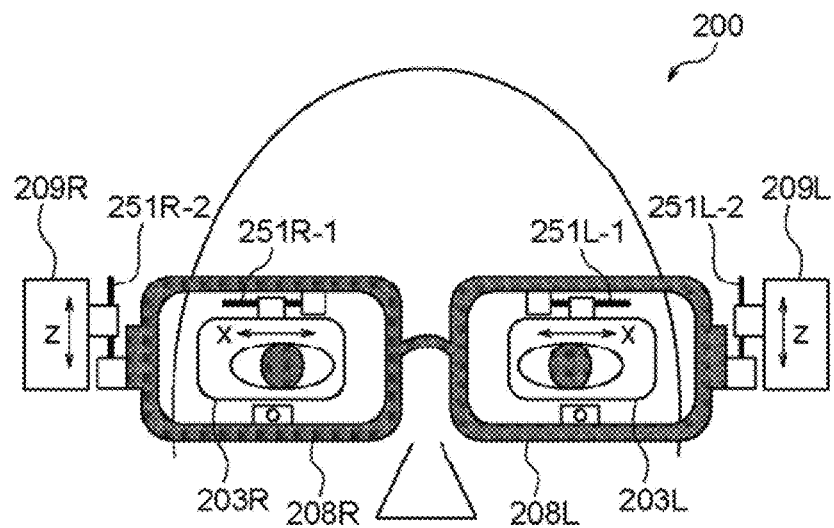
[FIG. 8]
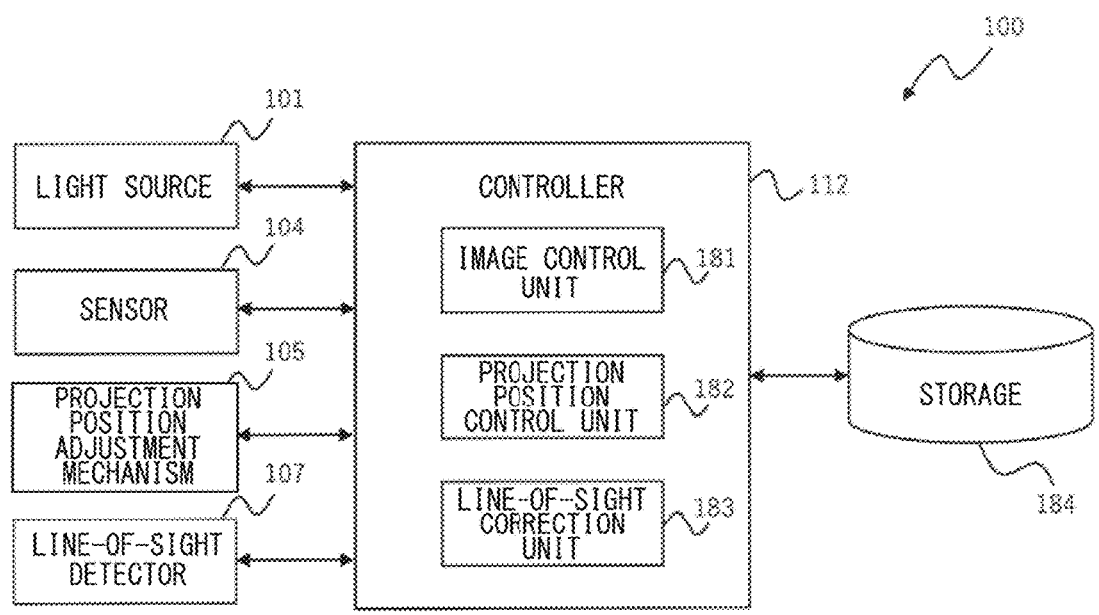

[FIG. 9]
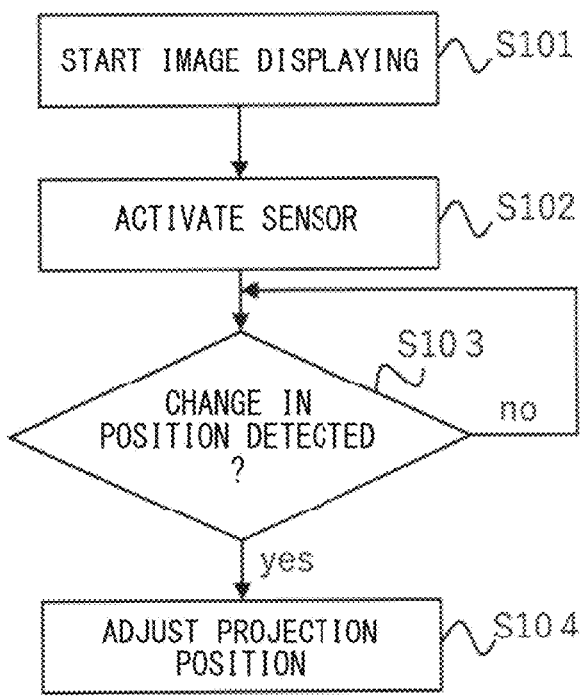

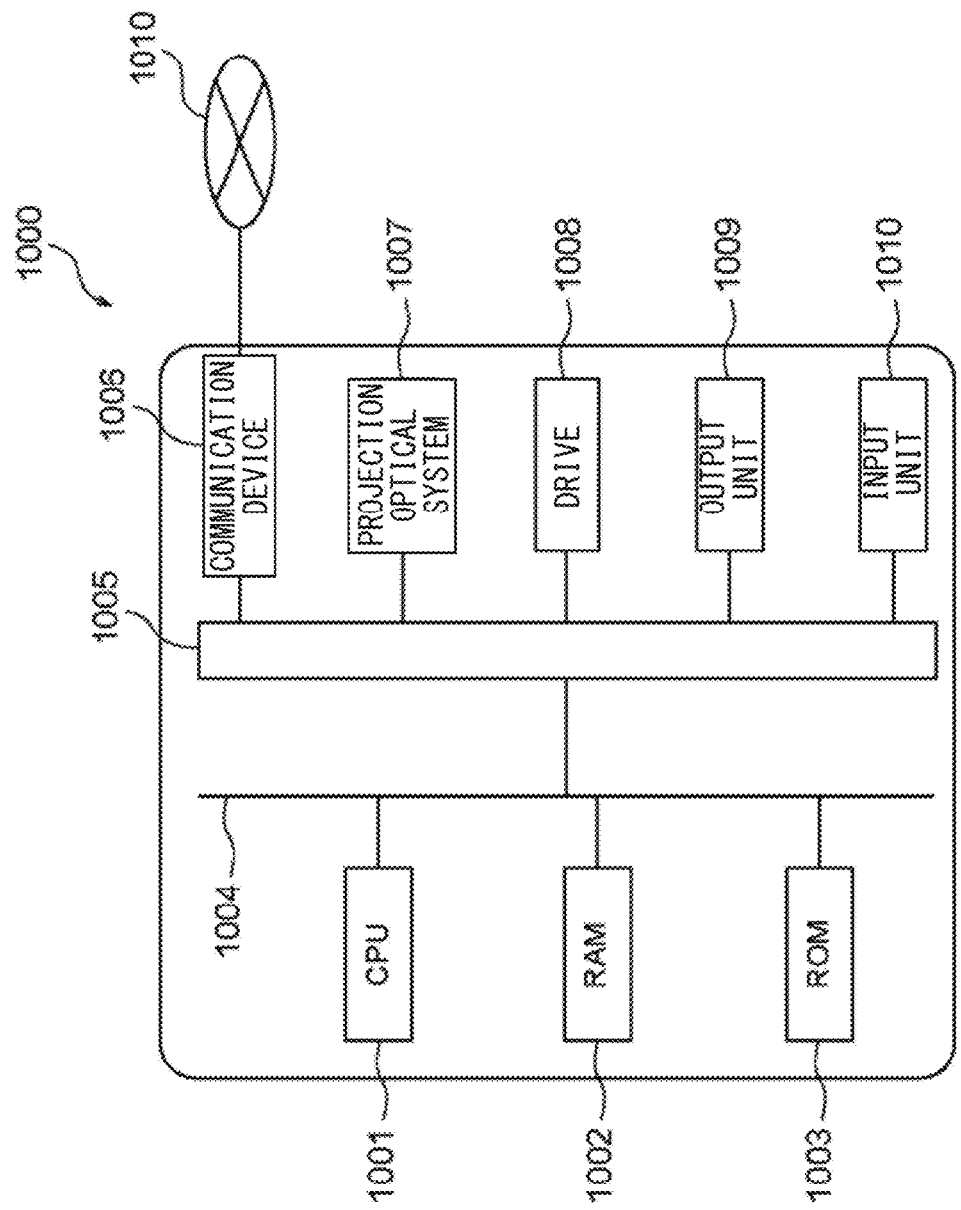
[FIG. 10]

[FIG. 11]
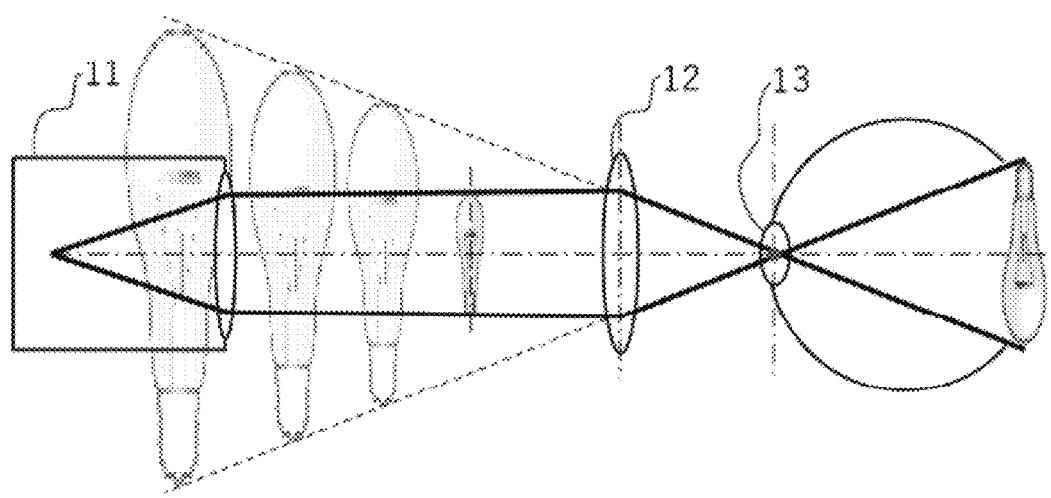
[FIG. 12]
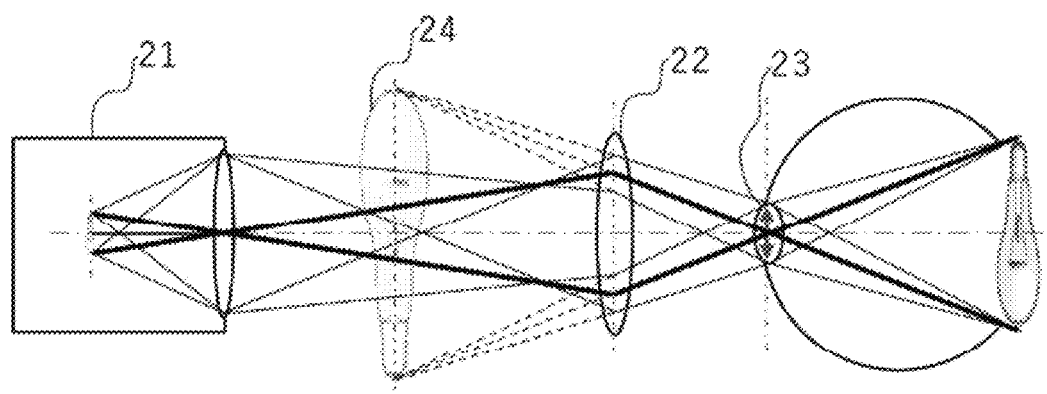

HEAD-MOUNTED DISPLAY APPARATUS, IMAGE DISPLAY SYSTEM, AND IMAGE DISPLAY METHOD TO DETERMINE MOUNTING DEVIATION

CROSS REFERENCE TO RELATED APPLICATIONS

This application is a U.S. National Phase of International Patent Application No. PCT/JP2020/041057 filed on Nov. 2, 2020, which claims priority benefit of Japanese Patent Application No. JP 2019-216423 filed in the Japan Patent Office on Nov. 29, 2019. Each of the above-referenced applications is hereby incorporated herein by reference in its entirety.

TECHNICAL FIELD

The technology relates to a head-mounted display apparatus, an image display system, and an image display method. More specifically, the technology relates to a head-mounted display apparatus that detects a change in position of the head-mounted display apparatus relative to a head, in particular an eyeball, an image display system including the head-mounted display apparatus, and an image display method of adjusting a projection position of image display light on the basis of the change in position of the head-mounted display apparatus.

BACKGROUND

Recently, a technique for displaying an image superimposed on an external landscape, such as an actual landscape, has drawn attention. The technique is also referred to as an augmented reality (AR) technique. An example product using the AR technique is a head-mounted display. The head-mounted display is worn on the head of a user when used. An image display method using the head-mounted display causes external light and light from the head-mounted display to reach the eyes of the user so that the user recognizes that an image formed by the light from the display is superimposed on an external image.

The head-mounted display projects image display light to the eyes of a user wearing the head-mounted display on the head. Unfortunately, the mounting position of the head-mounted display relative to the head sometimes deviates when the user moves the head, for example. Further, when the user wearing the head-mounted display apparatus moves (in particular, when the user exercises), the head-mounted display apparatus may deviate from the head due to its weight. Many head-mounted display apparatuses include a line-of-sight detection mechanism or a line-of-sight following mechanism for AR information, for example. In this case, the head-mounted display apparatus has a large weight, which is particularly likely to cause the deviation. As measures to address such a deviation, some techniques for detecting the mounting deviation and correcting a display image on the basis of image information on eyeballs have been proposed. For example, an image display unit disclosed in PTL 1 described below includes a calculation unit that calculates the amount of deviation of the position of the pupil of the observer's eye caused by the mounting deviation, and changes image light depending on the amount of deviation of the position of the pupil of the observer's eye.

CITATION LIST

Patent Literature

[PTL]
[PTL 1] Japanese Unexamined Patent Application Publication No. 2017-135605

SUMMARY OF THE INVENTION

Problems to be Solved by the Invention

The detection of the mounting deviation based on the image information on the eyeball sometimes fails to accurately measure the mounting deviation. For example, human biological changes and/or individual differences can hinder accurate measurement of the mounting deviation. Examples of the biological changes may include a change in size of the pupil, for example. Additionally, examples of the individual differences may include effects of hair and/or eyelashes on the image of the eyeball, the opening and closing frequency of an eyelid, or blocking of a pupil by blinking.

Measuring the mounting deviation accurately is particularly important for the head-mounted display apparatus of a retinal direct drawing scheme. The image displaying by the retinal direct drawing scheme needs to collect image display light at or near the pupil and determine an accurate position of the pupil. For example, when a pupil has a diameter of about 2 mm in a bright location, the position of the pupil needs to be determined with an accuracy of 1 mm or less. If the mounting deviation is not accurately determined, the head-mounted display apparatus finds it difficult to present an image to the user.

An object of the technology is to provide a head-mounted display apparatus making it possible to accurately determine the mounting deviation.

Means for Solving the Problem

The technology provides a head-mounted display apparatus including a sensor that detects a change in position of the head-mounted display apparatus relative to a head.

The sensor may not detect a reference axis of the eyeball of the user wearing the head-mounted display apparatus.

The sensor may detect the change in position of the head-mounted display apparatus relative to the head on the basis of a change in position of a portion where the sensor is provided relative to the head.

The head-mounted display apparatus may change a projection position to which the head-mounted display apparatus projects image display light on the basis of the change in position detected by the sensor.

According to one embodiment of the technology, the sensor may be provided on a portion of the head-mounted display apparatus in contact with the head.

According to one embodiment of the technology, the sensor may be provided on a portion of the head-mounted display apparatus in contact with the head, and may detect a contact pressure of the portion on the head.

According to another embodiment of the technology, the sensor may be provided on a portion of the head-mounted display apparatus not in contact with the head.

According to another embodiment of the technology, the sensor may be provided on a portion of the head-mounted display apparatus not in contact with the head, and may detect a change in position of the portion relative to a head reference position.

The head-mounted display apparatus may correct an image on the basis of the change in position detected by the sensor.

The head-mounted display apparatus may include an image display unit configured to collect image display light at or near a pupil and irradiate a retina with the image display light to provide a Maxwellian view.

The head-mounted display apparatus may be configured to project the image display light to both eyes of the user.

The head-mounted display apparatus may further include a line-of-sight detector that detects a line of sight of the user.

The line-of-sight detector may be a photodiode line-of-sight detector or an imaging line-of-sight detector.

The head-mounted display apparatus may further include a projection position adjustment mechanism that adjusts a projection position of image display light emitted from the head-mounted display apparatus.

The projection position adjustment mechanism adjusts the projection position of the image display light following the line of sight.

The head-mounted display apparatus may have a binocular-glasses-like shape, a monocular-glasses-like shape, a goggle-like shape, or a helmet-like shape.

The technology also provides an image display system including a head-mounted display apparatus including a sensor that detects a change in position of the head-mounted display apparatus relative to a head, and an information processor that sends image data to the head-mounted display apparatus.

The technology also provides an image display method including a detection step of detecting a change in position of the head-mounted display apparatus relative to a head, and an adjustment step of adjusting a position to which the head-mounted display apparatus projects image display light on the basis of the change in position detected in the detection step.

BRIEF DESCRIPTION OF THE DRAWINGS

FIG. 1 is a schematic top view of a head-mounted display apparatus according to the technology.

FIG. 2 is a schematic front view of the head-mounted display apparatus according to the technology.

FIG. 3 is a diagram illustrating an example of a sensor that detects a push on the basis of a change in light amount.

FIG. 4 is a diagram illustrating an example of a sensor that detects a push on the basis of a change in position where light is detected.

FIG. 5 is a schematic view illustrating an exemplary configuration of image display unit including three laser light sources.

FIG. 6 is a diagram illustrating an exemplary configuration of a projection position adjustment mechanism.

FIG. 7 is a diagram illustrating another exemplary configuration of the projection position adjustment mechanism.

FIG. 8 is a block diagram illustrating main components of the head-mounted display apparatus according to the technology.

FIG. 9 is a flowchart illustrating exemplary image display processing performed by the head-mounted display apparatus according to the technology.

FIG. 10 is a diagram illustrating an exemplary configuration of the head-mounted display apparatus according to the technology.

FIG. 11 is a diagram for explaining a Maxwellian view optical system.

FIG. 12 is a diagram for explaining an expansion optical system.

MODES FOR CARRYING OUT THE INVENTION

Some preferred embodiments for implementing the technology are described below. It is to be noted that the embodiments described below are representative embodiments of the technology, and that the scope of the technology should not be limited to these embodiments. It is to be noted that the description of the technology is made in the following order.
1. First Embodiment (Head-Mounted Display Apparatus)
    (1) Description of First Embodiment
    (2) Example of First Embodiment
    (2-1) Image Display Unit
    (2-2) Sensor Detecting Change in Position of Head-Mounted Display Apparatus Relative to Head
    (2-3) Line of Sight Detector
    (2-4) Projection Position Adjustment Mechanism
    (2-5) Controller and Storage
    (2-6) Example of Image Display Processing
    (3) Details of Sensor
    (4) Exemplary Configuration of Head-Mounted Display Apparatus
2. Second Embodiment (Image Display System)
3. Third Embodiment (Image Display Method)

1. First Embodiment (Head-Mounted Display Apparatus)

(1) Description of First Embodiment

A head-mounted display apparatus according to the technology includes a sensor that detects a change in position of the head-mounted display apparatus relative to a head. For example, the sensor may detect the change in position of the head-mounted display apparatus relative to the head on the basis of a change in position of a portion where the sensor is provided relative to the position. The head-mounted display apparatus may change a projection position to which the head-mounted display apparatus projects image display light on the basis of the change in position detected by the sensor.

Since the sensor detects the change in position of the head-mounted display apparatus relative to the head, the head-mounted display apparatus according to the technology makes it possible to accurately determine a mounting deviation of the head-mounted display apparatus. This allows the image display light to be projected to an appropriate position, improving accuracy in detecting a line of sight. Further, the determination of the mounting deviation according to the technology are not affected by or are less susceptible to human biological changes or individual differences.

The sensor does not have to be a sensor that detects a reference axis of an eyeball of the user wearing the head-mounted display apparatus. The term "reference axis of an eyeball" used herein refers to a concept including a visual axis (also referred to as a line of sight), an optical axis, a pupil center axis, a line of fixation, a fixation line, and a line of aim. A technique has been known for detecting (or estimating) the line of sight among the reference axes of the eyeball. The detection of the change in position of the sensor does not have to be based on the detection of the reference axis of the eyeball nor the detection of the line of sight. It is to be noted that the phrase "the sensor does not detect the reference axis" does not mean that the head-mounted display apparatus should not include a line-of-sight detector. For example, the phrase means that the detection of the change in position of the sensor is performed independently from the line-of-sight detector.

Additionally, the sensor does not have to use the image information on the eye of the user wearing the head-mounted display apparatus. The image information on the eye may be, for example, image information acquired by an imaging device or a photodiode.

According to one embodiment of the technology, the sensor may be provided on a portion of the head-mounted display apparatus in contact with the head. In this embodiment, the sensor may detect a contact pressure of the portion on the head, for example.

According to another embodiment of the technology, the sensor may be provided on a portion of the head-mounted display apparatus not in contact with the head. In this embodiment, the sensor may detect a change in position of the portion relative to a head reference position.

Details of the sensor that may be used in these embodiments are described in (3) below.

According to one embodiment of the technology, the head-mounted display apparatus may include image display unit. The image display unit may be configured to collect image display light at or near a pupil and irradiate the retina with the image display light to provide a Maxwellian view. To present the user an image in the Maxwellian view, the image display light needs to be collected at or near the pupil as described above. If the mounting deviation is not accurately determined, the image display light can be hindered from being collected at an appropriate position. The head-mounted display apparatus according to the technology makes it possible to accurately determine a mounting deviation, and is thus suitable for displaying an image in the Maxwellian view.

A Maxwellian view optical system is described below with reference to FIG. 11.

Image display light projected from the image display unit 11 reaches an eye 13 through a hologram lens 12 in the Maxwellian view optical system, for example. The image display light is collected at or near the pupil, and incident on the retina. Using the Maxwellian view optical system, one dot of a display image (a minimum display unit) passes through one point on a crystalline lens. The image of one dot on the retina is unlikely to be affected by the condition of the crystalline lens. This allows even a user with myopia, hyperopia, or astigmatism, for example, to recognize an image clearly. Additionally, a virtual image viewed as if being floating in the space is a focus free image. Thus, the virtual image comes into focus wherever the virtual image is located distant from the eye. Using the Maxwellian view optical system, the image display light may be collected at or near the pupil or at a position shifted from the pupil by about several millimeters to several ten millimeters (e.g., 1 mm to 20 mm, in particular, 2 mm to 15 mm) in the optical axis direction. It is possible to achieve the Maxwellian view even when the focus is not located on the pupil as in the latter case. Shifting the focus in the optical axis direction helps prevent the user from missing the image even when the image is shifted.

The image display unit included in the head-mounted display apparatus according to the technology may be configured to present the user an image in an image display scheme other than the Maxwellian view image display scheme. For example, according to another embodiment of the technology, the image display unit may be configured to present the user an image using an expansion optical system.

The expansion optical system is described below with reference to FIG. 12. As illustrated in FIG. 12, image display light projected from the image display unit 21 reaches an eye 23 through a hologram lens 22 in the expansion optical system, for example. The light speed of the image display light passes over the entire eye (pupil) 23 and focuses on the retina. This allows the field of view to be secured easily even when the eye 23 or the hologram lens 22 is shifted, making the image unlikely to disappear. Additionally, a virtual image 24 viewed as if being floating in the space comes into focus at a fixed distance. The image recognized may thus differ depending on the visual acuity of the user. The optical system projecting the image display light using the expansion optical system may include, for example, a light source such as an LED and an image display such as a liquid crystal.

The head-mounted display apparatus according to the technology may be configured to project the image display light to both eyes of the user. For example, the head-mounted display apparatus according to the technology may include an image display unit for the left eye and an image display unit for the right eye. In this case, an effect caused by the mounting deviation may differ between the right eye and the left eye. Thus, it is particularly important to accurately determine the mounting deviation. Since the head-mounted display apparatus according to the technology makes it possible to accurately determine the mounting deviation, the head-mounted display apparatus is particularly suitable for the embodiment including the image display unit for the left eye and the image display unit for the right eye.

Alternatively, the head-mounted display apparatus according to the technology may be configured to project the image display light to either one of the right eye and the left eye. That is, the head-mounted display apparatus according to the technology may include either one of the image display unit for the left eye and the image display unit for the right eye.

The head-mounted display apparatus according to the technology may be a head-mounted display apparatus having a binocular-glasses-like shape, a monocular-glasses-like shape, a goggle-like shape, or a helmet-like shape, for example. However, the shape of the head-mounted display apparatus should not be limited to these shapes.

In a case where the head-mounted display apparatus has the binocular-glasses-like shape or the monocular-glasses-like shape, the sensor may be provided at any position on components (e.g., a frame portion) for holding a lens portion having the binocular-glasses-like shape or the monocular-glasses-like shape on the head. The lens portion may not necessarily have a lens function. The components may be, for example, an endpiece portion, a bridge portion, a rim portion, a hinge portion, a temple tip portion, a temple portion, a nose pad portion, and a pad arm portion. The sensor may be provided on one or more of these components. Alternatively, the sensor may be provided at any position on the lens portion having the binocular-glasses-like shape or the monocular-glasses-like shape. Alternatively, the sensor may be provided at any part on a headband portion (e.g., a headband portion in the form of a hairband) for fixing the head-mounted display apparatus having the binocular-glasses-like shape or the monocular-glasses like shape on the head. The position the portion where the sensor is provided should not be limited to these positions. For example, as described in (2) below, the sensor may be provided on the headband portion connected to the frame portion. For example, the sensor may detect the positional relationship of the frame portion and/or the lens portion to the head. In particular, the sensor may detect the positional relationship of one or more of these components to the head.

The binocular-glasses-like shape includes the shape of binocular glasses, a shape similar to binocular glasses, and the shape of a binocular eyewear used in the augmented reality (AR) field or the virtual reality (VR) field. The binocular-glasses-like shape may include two components corresponding to lenses of glasses (these components may not necessarily have a lens function), for example. These two components may be arranged in front of respective eyes.

The monocular-glasses-like shape includes the shape of monocular glasses, a shape similar to monocular glasses, and the shape of a monocular eyewear used in the augmented reality (AR) field or the virtual reality (VR) field. The monocular-glasses-like shape includes, for example, a monocular shape or a so-called scouter shape. The monocular-glasses-like shape may include a single component corresponding to a lens of glasses (this component may not necessarily have a lens function), for example. The single component may be arranged in front of an eye.

In a case where the head-mounted display apparatus has the goggle-like shape, the sensor may be provided at any position on the components forming the goggle-like shape. The components may be, for example, a frame portion, a lens portion, a strap portion, and a foam portion (i.e., a cotton member for keeping the goggle and the face in close contact with each other). The sensor may be provided on one or more of the components. For example, the sensor may detect the positional relationship of one or more of the components to the head.

The goggle-like shape includes a shape similar to a goggle and the shape of a goggle-like eyewear used in the AR field or the VR field. The goggle-like shape may be designed to present the AR or VR to the user.

In the case where the sensor has the helmet-like shape, the sensor may be provided at any position on the components forming the helmet-like shape. The components may be, for example, a shell portion, a liner portion, an outer visor portion, an inner visor portion, a shield portion, a strap portion, a headband portion, an earpad portion, and a chin guard portion. The sensor may be provided on one or more of the components. For example, the sensor may detect the positional relationship of one or more of the components to the head.

The helmet-like shape includes the shape of a helmet, a shape similar to a helmet, and the shape of a helmet-like display used in the AR field or the VR field. The helmet-like shape may be designed to be worn on the head for protection. In particular, the helmet-like shape may be designed to be worn on the head to protect at least the front, top, sides, and back of the head.

Images presented to the user by the head-mounted display apparatus according to the technology may be moving images, static images, or both of them. The image may be, for example, an image for presenting information to the user, more specifically, an image for assisting a user's operation. Examples of the image may include a teaching image for the user, a navigation image for the user, and a gaming image for the user. However, the image should not be limited to these images. Since the head-mounted display apparatus according to the technology makes it possible to accurately determine the mounting deviation, it is possible to provide favorable image displaying even when the mounting deviation is generated by a user's operation.

(2) Example of First Embodiment

An example of the head-mounted display apparatus according to the technology is described below with reference to FIGS. 1 and 2. FIG. 1 is a schematic top view of the head-mounted display apparatus according to the technology worn on the head of the user. FIG. 2 is a schematic front view of the head-mounted display apparatus worn on the head of the user. The head-mounted display apparatus illustrated in FIG. 1 includes an image display unit, a sensor that detects a change in position of the head-mounted display apparatus relative to the head, a line-of-sight detector, a projection position adjustment mechanism, a controller, and a storage. Herein, the sensor that detects the change in position of the head-mounted display apparatus relative to the heads is also referred to as a "displacement sensor" or a "sensor". These components are described below.

(2-1) Image Display Unit

As illustrated in FIG. 1, a head-mounted display apparatus 100 has a glasses-like shape. The head-mounted display apparatus 100 is configured to project image display light to respective eyes. That is, the head-mounted display apparatus 100 includes an image display unit projecting the display image light to the left eye and an image display unit projecting the display image light to the right eye. The image display unit projecting the display image light to the left eye includes a light source 101L, a projection optical system 102L, and a holographic optical element (hereinafter also referred to as an HOE) 103L.

The light source 101L outputs image display light. As a configuration for outputting the image display light, the light source 101L may include, for example, a laser light source 120L, a mirror 121L, and a scan mirror 122L. A laser beam outputted from the laser light source 120L is reflected by the mirror 121L and reaches the scan mirror 122L. The scan mirror 122L scans the laser beam in a two-dimensional manner. The scan mirror 122L may be, for example, a MEMS mirror. The scan mirror 122L may move the direction of the laser beam at high speed to form an image on the retina.

The projection optical system 102L adjusts the direction of the image display light so that the image display light reaches a desired region and/or a desired position of the HOE 103L. For example, the projection optical system 102L collimates the image display light scanned by the scan mirror 122L.

The HOE 103L diffracts the image display light so that the image display light is collected at or near the pupil of the user and incident on the retina. The HOE 103L may be a reflective diffraction element, for example. The HOE 103L may have the following optical properties: The HOE 103L may serve as a lens against light within the wavelength range of the image display light, and pass light out of the wavelength range through the HOE 103L. These optical properties allow the user to recognize, through the HOE 103L, a front landscape in the direction of the line of sight and an image formed by the image display light. That is, it is possible to superimpose the image formed by the image display light on an external landscape. The HOE 103L may be, for example, a hologram lens, preferably, a hologram lens film, more preferably, a transparent hologram lens film. The hologram lens film may be attached to glass when used, for example. A desired optical property may be imparted to the hologram lens by a technique known in the technical field. The hologram lens may be a commercially available hologram lens or may be produced by a technique known in the technical field.

As described above, the light source 101L, the projection optical system 102L, and the HOE 103L allow the image display light to reach the left eye of the user.

The head-mounted display apparatus 100 includes a temple portion 109L and a rim portion 108L that are portions of the glasses-like shape. On the temple portion 109L, the light source 101L and the projection optical system 102L are provided. The HOE 103L is held by the rim portion 108L. More specifically, an inner rim portion 106L is held by the rim portion 108L via a projection position adjustment mechanism 105L-2, and the HOE 103L is held by the inner rim portion 106L via a projection position adjustment mechanism 105L-1.

The image display unit projecting the image display light to the right eye of the user includes a light source 101R, a projection optical system 102R, and an HOE 103R. The descriptions of the light source 101L, the projection optical system 102L, and the HOE 103L are also applicable to the light source 101R, the projection optical system 102R, and the HOE 103R.

As with the case of the image display unit for the left eye, the light source 101R and the projection optical system 102R are provided on a temple portion 109R. The HOE 103R is held by a rim portion 108R. More specifically, an inner rim portion 106R is held by the rim portion 108R via a projection position adjustment mechanism 105R-2, and the HOE 103R is held by the inner rim portion 106R via a projection position adjustment mechanism 105R-1.

The rim portions 108L and 108R of the head-mounted display apparatus 100 are coupled to each other via a bridge portion 110. The bridge portion 110 is placed on the nose of the user when the head-mounted display apparatus 100 is worn by the user.

Additionally, both of the rim portion 108L and 108R of the head-mounted display apparatus 100 are coupled to a headband portion 111. As illustrated in FIG. 2, the headband portion 111 comes into contact with the top of the head of the user when the head-mounted display apparatus 100 is worn by the user.

The light source 101L illustrated in FIG. 1 includes the single laser light source 120L. However, the light source 101L may include two or more laser light sources, for example, two to five laser light sources. These laser light sources may output laser beams having different wavelengths from each other. FIG. 5 illustrates an exemplary configuration of the image display unit including three laser light sources. A light source 150L illustrated in FIG. 5 may include laser light sources 151L-1, 151L-2, and 151L-3. These three laser light sources output laser beams having different wavelengths from each other. The laser beams outputted from these three laser light source are combined at mirrors 152L-1, 152L-2, and 152L-3, and the combined laser light is reflected by a mirror 153L and reaches a scan mirror 154L. The scan mirror 154L scans the combined laser light in a two-dimensional manner. The scan mirror 154L may move the direction of the laser light at high speed to form an image on the retina. The light source 150R includes the same configuration as the light source 150L.

(2-2) Sensor Detecting Change in Position of Head-Mounted Display Apparatus Relative to Head The head-mounted display apparatus 100 further includes sensors 104L, 104R, 104C, and 104T that detect the change in position of the head-mounted display apparatus 100 relative to the head of the user. The change in position detected by these sensors may be, for example, the direction in which the position changes and/or the amount of the change. Specific exemplary configurations of these sensors are described in (3) below.

It is to be noted that, herein, the sensors 104L, 104R, 104C, and 104T may be collectively referred to as a sensor 104.

The sensor 104L is provided on a part of the temple portion 109L of the head-mounted display apparatus 100 in contact with the head. For example, the sensor 104L is provided on a part of the temple portion 109L in contact with the head surface at or near the left ear of the user.

The sensor 104L detects a change in position of the part relative to the head of the user (i.e., a change in position of a portion where the sensor 104L is provided relative to the head of the user). For example, the sensor 104L may detect the change in position on the basis of a change in contact pressure on the part in contact with the head surface at or near the left ear of the user.

The change in position detected by the sensor 104L may be, for example, a change in position of the head-mounted display apparatus 100 in a horizontal direction (e.g., an x-direction illustrated in FIG. 1 along a straight line connecting the ears of the user). The mounting deviation may be generated when an acceleration rate is applied to the head-mounted display apparatus 100 in the horizontal direction when the user shakes his/her head, for example. It is possible to deal with the mounting deviation by the sensor detecting the mounting deviation in the x-axis direction.

The sensor 104L sends data on the detected change in position to a controller 112 described below. The data on the change in position may include, for example, data regarding the direction of the change in position and/or data regarding the amount of the change, and preferably both of them. The controller 112 may adjust the projection position of the image display light projected by the light source 101L or the image display light itself on the basis of the data on the change in position received. Additionally, the controller 112 may correct the line of sight and/or drive the projection adjustment mechanism on the basis of the data on the change in position received.

The sensor 104R is provided on a part of the temple portion 109R in contact with the head. For example, the sensor 104R is provided on a part of the temple portion 109R in contact with the head surface at or near the right ear of the user.

The sensor 104R detects a change in position of the part relative to the head of the user (i.e., a change in position of a portion where the sensor 104R is provided relative to the head of the user). For example, the sensor 104R may detect the change in position on the basis of a change in contact pressure on the part in contact with the head surface at or near the right ear of the user.

The change in position detected by the sensor 104R may be, for example, a change in position of the head-mounted display apparatus 100 in the horizontal direction (e.g., the x-direction illustrated in FIG. 1 along the straight line connecting the ears of the user).

The sensor 104R sends data on the detected change in position to the controller 112. The data on the change in position may be, for example, the data regarding the direction of the change in position and/or the data regarding the amount of the change, and preferably both of them.

The sensor 104C is provided on the bridge portion 110 of the head-mounted display apparatus 100. The sensor 104C is provided on a part in contact with the nose of the user and the vicinity of the nose of the user when the head-mounted display apparatus 100 is worn by the user.

The sensor 104C detects a change in position of the part relative to the head of the user (i.e., a change in position of a portion where the sensor 104C is provided relative to the head of the user). For example, the sensor 104C may detect the change in position on the basis of a change in contact pressure on the part in contact with the head surface at or near the nose of the user.

The change in position detected by the sensor 104C may be, for example, a change in position of the head-mounted display apparatus 100 in an anterior-posterior direction of the user (e.g., a y-direction illustrated in FIG. 1 along a straight line connecting the nose of the user and the back of the head). The mounting deviation may be generated when an acceleration rate is applied to the head-mounted display apparatus 100 in the horizontal direction when the user shakes his/her head, for example. It is possible to deal with the mounting deviation by the sensor detecting the mounting deviation in the y-axis direction.

The sensor 104C sends data on the detected change in position to the controller 112. The data on the change in position may include, for example, the data regarding the direction of the change in position and/or the data regarding the amount of the change, and preferably both of them.

The sensor 104T is provided on the headband portion 111 of the head-mounted display apparatus 100. The sensor 104T is provided on a part in contact with the top portion of the head of the user when the head-mounted display apparatus 100 is worn by the user.

The sensor 104T detects a change in position of the part relative to the head of the user (i.e., a change in position of a portion where the sensor 104T is provided relative to the head of the user). For example, the sensor 104T may detect the change in position on the basis of a change in contact pressure on the part in contact with the head surface at or near the top portion of the head of the user.

The change in position detected by the sensor 104T may be, for example, a change in position of the head-mounted display apparatus 100 in a vertical direction (e.g., a z-direction illustrated in FIG. 2 along a straight line connecting the top portion of the head and the neck portion of the user). The mounting deviation may be generated when an acceleration rate is applied to the head-mounted display apparatus 100 in the direction of gravitational force when the user walks, for example. It is possible to deal with the mounting deviation by the sensor detecting the mounting deviation in the z-axis direction.

The sensor 104T sends data on the detected change in position to the controller 112. The data on the change in position may include, for example, the data regarding the direction of the change in position and/or the data regarding the amount of the change, and preferably both of them.

As described above, the sensors 104L and 104R detect the change in position of the head-mounted display apparatus 100 in the horizontal direction relative to the head of the user, the sensor 104C detects the change in position of the head-mounted display apparatus 100 in the anterior-posterior direction relative to the head of the user, and the sensor 104T detects the change in position of the head-mounted display apparatus 100 in the vertical direction relative to the head of the user. Accordingly, it is possible to determine the mounting deviation in a three-dimensional manner.

(2-3) Line-of-Sight Detector

The head-mounted display apparatus 100 may further include line-of-sight detectors 107L and 107R that detect lines of sight of the user. Herein, the line-of-sight detectors 107L and 107R may be collectively referred to as a line-of-sight detector 107. The head-mounted display apparatus 100 including these line-of-sight detectors makes it possible to adjust the position of an image presented to the user to a more appropriate position. For example, when an image presented by the head-mounted display apparatus 100 is superimposed on an external image, the head-mounted display apparatus 100 makes it possible to detect the line of sight of the user to adjust the position of the image to a more appropriate position. That is, including the line-of-sight detector 107 is preferable to presentation of AR information.

The line-of-sight detector 107 may be, for example, an imaging line-of-sight detector or a photodiode line-of-sight detector. These line-of-sight detectors are described in more detail below.

The line-of-sight detector 107L detects the line of sight of the left eye of the user. The line-of-sight detector 107L may be provided on any position of the rim portion 108L, for example; however, the line-of-sight detector 107L may be provided on any position on another component (e.g., the inner rim portion 106L) as long as the line-of-sight detector 107L makes it possible to detect the line of sight of the left eye.

The line-of-sight detector 107L may be, for example, a photodiode line-of-sight detector. The photodiode line-of-sight detector may include, for example, a combination of a light source and a photodiode.

The light source is configured to emit light to the left eye. Preferably, the light source is an infrared light illumination source. This reduces effects on recognition of an external image and recognition of the image display light by the user.

The photodiode may be configured to detect light (in particular, infrared light) emitted from the light source and reflected from the eyeball. The photodiode may detect the difference between the amount of reflected light from a black portion (pupil) and the amount of reflected light from a white portion (sclera).

The photodiode line-of-sight detector may detect the line of sight on the basis of the ratio of area of the black portion and the ratio of area of the white portion that are detected by the photodiode.

The photodiode line-of-sight detector is unable to detect the mounting deviation if generated. Thus, the accuracy of the line-of-sight detector in detecting the line of sight can be decreased when the mounting deviation is generated.

As described above, the head-mounted display apparatus according to the technology includes a sensor that detects a change in position of the head-mounted display apparatus relative to the head, and is thus able to detect the mounting deviation. The line of sight is corrected on the basis of the mounting deviation detected by the sensor. This increases the accuracy of line-of-sight detector in detecting the line of sight. The head-mounted display apparatus according to the technology may detect the line of sight with an accuracy of, for example, 3 mm or less, in particular, 2 mm or less, in more particular, 1 mm or less. The line-of-sight detection with such an accuracy is particularly preferable to image presentation in the Maxwellian view.

Alternatively, the line-of-sight detector 107L may be an imaging line-of-sight detector, as with the case of the photodiode line-of-sight. The imaging line-of-sight detector may include, for example, a combination of a light source and an imaging element.

The light source is configured to emit light to the left eye. Preferably, the light source is an infrared light illumination source.

The imaging element may be configured to, for example, acquire an image from which a reflected image of the light source on the eyeball (particularly the cornea) (a so-called Purkinje image) and the center of the pupil are retrieved. The imaging element may be, for example, an infrared light imaging element.

The imaging line-of-sight detector may estimate the optical axis of an eyeball on the basis of the Purkinje image and the image described above. The line-of-sight detector may detect the line of sight by converting the estimated optical axis into a visual axis.

If the positional relationship between the light source and the eyeball is fixed in the line-of-sight detection based on the Purkinje image and the image described above, the Purkinje image is generated at a fixed position. The mounting deviation can result in a shift in the positional relationship, changing the position where the Purkinje image is generated. Additionally, the line-of-sight detection is likely to be susceptible to effects of blinking, hair, or eyelashes. Further, the line-of-sight detection generally involves calibration for correcting individual differences. When the mounting deviation is generated, the calibration needs to be performed again.

The head-mounted display apparatus according to the technology includes the sensor that detects the change in the head-mounted display apparatus relative to the head, and thus makes it possible to detect the mounting deviation. Accordingly, it is possible to perform the line-of-sight detection with high accuracy by preparing a correction value based on the mounting deviation in advance (e.g., storing the correction value in a storage) and performing correction using the correction value when the mounting deviation is generated, for example. Additionally, the mounting deviation detection is unlikely to be susceptible to effects of blinking, hair, or eyelashes. Further, it is also possible to reduce the number of executions of the calibration by performing the correction based on the detected mounting deviation.

(2-4) Projection Position Adjustment Mechanism

The head-mounted display apparatus 100 may further include projection position adjustment mechanisms 105L-1, 105L-2, 105R-1, and 105R-2 that adjust a projection position of image display light outputted from the head-mounted display apparatus 100. It is to be noted that these four projection position adjustment mechanisms are hereinafter collectively referred to as a projection position adjustment mechanism 105. The projection position adjustment mechanism 105 may be configured to adjust the projection position of the image display light following the line of sight, for example. That is, the projection position adjustment mechanism 105 may be a line-of-sight following mechanism. It is possible to adjust the projection position of the image display light by the projection position adjustment mechanism 105 on the basis of the mounting deviation.

Additionally, it is possible to adjust the projection position of the image display light by the projection position adjustment mechanism 105 on the basis of rotation movements of the eyeball and movements of the line of sight. For example, the head-mounted display apparatus 100 including the projection position adjustment mechanism 105 makes it possible to adjust the position of an image presented to the user to a more appropriate position. For example, when an image presented by the head-mounted display apparatus 100 to the user is superimposed on an external image, the head-mounted display apparatus 100 makes it possible to detect the line of sight of the user to display the image at a more appropriate position. That is, including the line-of-sight detector 107 is preferable to presentation of AR information. Further, when an image in the Maxwellian view is to be displayed, it is possible to adjust the position where the image display light is collected by the projection position adjustment mechanism.

The projection position adjustment mechanism 105 is described with reference to FIG. 6. FIG. 6 is a diagram illustrating the projection position adjustment mechanism.

The projection position adjustment mechanisms 105L-1 and 105L-2 adjust the projection position of the image display light on the left eye.

The projection position adjustment mechanism 105L-1 adjusts the positional relationship between the inner rim portion 106L and the rim portion 108L in the z-axis direction. For example, the projection position adjustment mechanism 105L-1 moves the inner rim portion 106L in the z-axis direction relative to the rim portion 108L. This adjusts the position of the HOE 103L in the z-axis direction.

The projection position adjustment mechanism 105L-2 adjusts the positional relationship between the HOE 103L and the inner rim portion 106L in the x-axis direction. For example, the projection position adjustment mechanism 105L-2 moves the HOE 103L in the x-axis direction relative to the inner rim portion 106L. This adjusts the position of the HOE 103L in the x-axis direction.

The adjustment of the positional relationship between the inner rim portion 106L and the rim portion 108L in the z-axis direction by the projection position adjustment mechanism 105L-1 is driven by a drive element, such as a piezoelectric element, an actuator, or a bimetal. However, the drive element should not be limited to these elements.

The adjustment of the positional relationship between the HOE 103L and the inner rim portion 106L by the projection position adjustment mechanism 105L-2 is also driven by a drive element, such as a piezoelectric element, an actuator, or a bimetal. However, the drive element should not be limited to these elements.

The projection position adjustment mechanism 105L-1 may adjust the positional relationship between the inner rim portion 106L and the rim portion 108L in the z-axis direction on the basis of the change in position of the head-mounted display apparatus 100 detected by one, two, three, or all of the four sensors 104L, 104R, 104C, and 104T, for example. Alternatively, the projection position adjustment mechanism 105L-1 may adjust the positional relationship on the basis of the change in position and the line of sight detected by the line-of-sight detector 107L.

The projection position adjustment mechanism 105L-2 may adjust the positional relationship between the HOE 103L and the inner rim portion 106L in the x-axis direction on the basis of the change in position of the head-mounted display apparatus 100 detected by one, two, three, or all of the four sensors 104L, 104R, 104C, and 104T, for example. Alternatively, the projection position adjustment mechanism 105L-2 may adjust the positional relationship on the basis of the change in position and the line of sight detected by the line-of-sight detector 107L.

The projection position adjustment mechanisms 105R-1 and 105R-2 adjust the projection position of the image display light incident on the right eye. The adjustment may be performed as in the adjustment by the projection position adjustment mechanisms 105L-1 and 105L-2.

Another exemplary configuration of the projection position adjustment mechanism included in the head-mounted display apparatus according to the technology is described in FIG. 7. FIG. 7 illustrates a head-mounted display apparatus 200 including a HOE 203L and a rim portion 208L as a configuration for projecting the image display light to the left eye.

The HOE 203L and the rim portion 208L are coupled via the projection position adjustment mechanism 251L-1. The projection position adjustment mechanism 251L-1 may adjust the positional relationship between the HOE 203L and the rim portion 208L in the x-axis direction.

The temple portion 209L and the rim portion 208L are coupled via the projection position adjustment mechanism 251L-2. The projection position adjustment mechanism 251L-2 may adjust the positional relationship between the temple portion 209L and the rim portion 208L in the y-axis direction.

A configuration for projecting the image display light to the right eye is the same as the configuration for the left eye.

Such a configuration described above makes it possible to simplify the configuration of the rim portion.

(2-5) Controller and Storage

The head-mounted display apparatus 100 includes the controller 112. As in FIG. 8 that is a block diagram illustrating main components of the head-mounted display apparatus 100, the controller 112 includes an image control unit 181, a projection position control unit 182, and a line-of-sight correction unit 183.

The image control unit 181 controls projection of the image display light by the image display unit. The image control unit 181 may output the image display light by driving the light sources 101L and 101R, in particular, laser light sources and scan mirrors included in the light sources. The image control unit 181 may acquire image data stored in a storage 184, and output the image display light to the light sources 101L and 101R on the basis of the image data, for example. The image control unit 181 may correct the image data on the basis of the change in position of the head-mounted display apparatus 100 relative to the head detected by the sensor 104. The image control unit 181 may output the image display light to the light sources 101L and 101R on the basis of the corrected image data. That is, the head-mounted display apparatus 100 may correct an image on the basis of the change in position detected by the sensor that detects a change in position of the head-mounted display apparatus relative to the head.

The projection position control unit 182 may control the projection position adjustment mechanisms 105L-1, 105L-2, 105R-1, and 105R-2. This may control the projection position of the image display light.

For example, the projection position control unit 182 may adjust the projection position of the image display light by driving at least one of the projection position adjustment mechanisms 105L-1, 105L-2, 105R-1, and 105R-2 on the basis of the line of sight detected by the line-of-sight detectors 107L and 107R. For example, the projection position of the image display light may be adjusted to follow the line of sight.

The projection position control unit 182 may adjust the projection position of the image display light by driving at least one of the projection position adjustment mechanisms 105L-1, 105L-2, 105R-1, and 105R-2 on the basis of the line of sight corrected by the line-of-sight correction unit 183 described below. For example, the projection position of the image display light may be adjusted to follow the line of sight.

The projection position control unit 182 may adjust the projection position of the image display light by driving at least one of the projection position adjustment mechanisms 105L-1, 105L-2, 105R-1, and 105R-2 on the basis of the data regarding the change in position of the head-mounted display apparatus 100 relative to the head detected by at least one of the sensors 104L, 104R, 104C, and 104T (hereinafter also referred to as displacement data).

The projection position control unit 182 may calculate the amount of position adjustment performed by each of the respective projection position adjustment mechanisms on the basis of the displacement data and a correction coefficient, for example. The projection position control unit 182 may drive each of the projection position adjustment mechanism so that the positional relationship is changed by the calculated amount of position adjustment.

The projection position control unit 182 may acquire the correction coefficient from a correction table preliminarily stored in the storage 184, and use the correction coefficient for the calculation of the amount of position adjustment described above. The correction table may include a plurality of correction coefficients, for example. The projection position control unit 182 may select a predetermined correction coefficient from the plurality of correction coefficients on the basis of the displacement data. Alternatively, the correction table may be provided to each of the projection position adjustment mechanisms, for example. The correction table may be preliminarily provided to the head-mounted display apparatus 100 or may be updated in response to the use of the head-mounted display apparatus 100 by the user. The selection or updating of the correction table or the correction coefficient makes it possible to increase the accuracy of the projection position control.

The projection position control unit 182 may calculate the amount of position adjustment using the line of sight detected by the line-of-sight detector or the line of sight corrected by the line-of-sight correction unit 183.

The line-of-sight correction unit 183 corrects the line of sight detected by the line-of-sight detectors 107L and 107R on the basis of the displacement data. This allows the line-of-sight correction unit 183 to identify the line of sight in view of the mounting deviation, increasing the accuracy in detecting the line of sight. The correction may be performed with reference to the optical axis of the eyeball, the visual axis of the eyeball, or another reference axis.

Likewise, the line-of-sight correction unit 183 may acquire the correction coefficient from the correction table preliminarily stored in the storage 184, and use the correction coefficient for the correction of the line of sight. The correction table may include a plurality of correction coefficients, for example. The line-of-sight correction unit 183 may select a predetermined correction coefficient from the plurality of correction coefficients on the basis of the displacement data. The correction table may be preliminarily provided to the head-mounted display apparatus 100 or may be updated in response to the use of the head-mounted display apparatus 100 by the user. The selection or updating of the correction table or the correction coefficient makes it possible to increase the accuracy of the line-of-sight correction.

The head-mounted display apparatus 100 may further include the storage 184. The storage may store the data regarding the image display light outputted from the image display unit, the correction table used for the projection position control performed by the projection position control unit 122, and the correction table used for the line-of-sight correction performed by the line-of-sight correction unit 123.

(2-6) Example of Image Display Processing

FIG. 9 illustrates a flowchart of image display processing performed by the head-mounted display apparatus 100.

In Step S101, the head-mounted display apparatus 100 starts presenting an image to the user. Specifically, the controller 112 (in particular, the image control unit 181) drives the light source 101 to start outputting the image display light. For example, the image control unit 181 reads image data stored in the storage 184 and causes the light source 101 to output the image display light on the basis of the image data.

Prior to Step S101, the head-mounted display apparatus 100 may present an image, a sound, or both of them to the user wearing the apparatus to urge the user to perform an operation necessary for the calibration of the apparatus, for example. The calibration may be, for example, correction for updating the settings of the sensor 104, the projection position adjustment mechanism 105, or the line-of-sight detector 107. Alternatively, the calibration may be correction for updating the various correction tables described above.

For example, the calibration may be performed as follows. First, the user wears the head-mounted display apparatus 100 on the head. Next, the head-mounted display apparatus 100 presents, for example, a position adjustment marker image to the user to urge the user to adjust the position of the display 100. Thereafter, the user adjusts the position of the apparatus 100 with reference to the image, and fixes the positional relationship between the apparatus 100 and the head. Next, the apparatus 100 stores the positional relationship as an initial positional relationship. At this time, the apparatus 100 may store an inter pupillary distance (IPD). Thereafter, the apparatus 100 confirms if the line of sight of the user has been detected and/or tracked on the basis of the initial positional relationship. When confirming that the line of sight of the user has been detected and/or tracked, the apparatus 100 terminates the calibration. If the detection and/or tracking is not confirmed, the apparatus 100 repeats the operations from urging the user to adjust the position to confirming the detection and/or tracking.

The initial positional relationship (or the initial positional relationship and the IPD) described above may be stored in the storage as an initial amount of adjustment performed by each user. This allows each user to retrieve the initial amount of adjustment corresponding to the user from the storage when multiple users use the same head-mounted display apparatus. This makes it possible to save time required for the calibration.

In Step S102, the controller 112 activates the sensor 104 that detects a change in position of the head-mounted display apparatus 100 relative to the head in response to the presentation of the image. The sensor 104 then starts continuously monitoring the presence or absence of the change in position. Details of the detection are as in (2-2) described above.

In Step S102, the line-of-sight detector 107 may be activated in response to the presentation of the image. During the presentation of the image, the line-of-sight detector 107 may continuously detect the line of sight of the user. The projection position of the image display light may be changed to follow the movement of the line of sight.

In Step S103, the sensor 104 may send the controller 112 the data regarding the change in position (the displacement data) if the sensor 104 detects the change in position. When receiving the displacement data, the controller 112 cause the procedure to proceed to Step S103.

If the change in position is not detected, the sensor 104 continues to monitor the presence or absence of the change in position.

In Step S104, the controller 112 (in particular, the projection position control unit 182) adjusts the position to which the image display light is projected on the basis of the change in position. For example, the projection position control unit 182 calculates a position adjustment amount on the basis of the displacement data. Thereafter, the projection position control unit 182 drives the projection position adjustment mechanism 105 to move the projection position of the image display light by the calculated position adjustment amount.

The projection position control unit 182 may use a correction table to calculate the position adjustment amount, for example. For instance, the projection position control unit 182 may read the correction table stored in the storage 184 and calculate the position adjustment amount on the basis of the correction table and the displacement data. The correction table may include a plurality of correction coefficients. For example, a correction coefficient for the calculation may be selected from the plurality of correction coefficients included in the correction table on the basis of the displacement data.

To calculate the position adjustment amount in the adjustment of the projection position in Step S104, the line of sight detected by the line-of-sight detector 107 may be used, for example.

In Step S104, the projection position control unit 182 drives the projection position adjustment mechanism so that the projection position is changed by the calculated position adjustment amount. The position to which the image display light is projected is thereby adjusted.

The detection of the change in position in Step S103 and the adjustment of the projection position in Step S104 may be performed while the image display light is projected from the image display unit, for example. That is, Steps S103 and 104 may be performed while the image display unit is continuously projecting the image display light. This allows the projection position of the image display light to be adjusted on the basis of the change in position of the head-mounted display apparatus 100 relative to the head while images are presented to the user without any interruption. Accordingly, the user may recognize that the image is moving following the line of sight, for example.

Alternatively, after the change in position is detected in Step S103, the presentation of the image by the image display unit may be temporary suspended. For example, when the change in position of the head-mounted display apparatus 100 relative to the head is large, the image may move outside the visual range of the user. In such a case, the image control unit 181 may stop presenting the image on the basis of the large change in position detected in Step S103, and restart the presentation of the image after the adjustment in Step S104 is completed. This makes the user recognize that an image having disappeared from the visual range appears again in the direction of the line of sight rather than that the image returns from outside the visual range.

It is to be noted that the acquired displacement data may be used to measure the fixing force of the head-mounted display apparatus 100 on the head. Measuring the fixing force allows the user to secure the head-mounted display apparatus 100 to the head with an appropriate fixing force. Additionally, securing with an appropriate fixing force contributes to comfortable wearing of the head-mounted display apparatus 100 for a longer time and reduces the mounting deviation.

(3) Details of Sensor

Although the head-mounted display apparatus illustrated in FIG. 1 includes the four sensors detecting the change in position of the head-mounted display apparatus relative to the head, the head-mounted display apparatus according to the technology only has to include at least one sensor that detect the change in position of the head-mounted display apparatus relative to the head. That is, the head-mounted display apparatus according to the technology may include at least one sensor detecting the change in position of the head-mounted display apparatus relative to the head, and the number of the sensors provided in the apparatus may be, more specifically, 1 to 10, more particularly, 1 to 6, still more particularly, 1 to 4, for example.

As illustrated in FIG. 1, the sensor may be provided on a portion of the head-mounted display apparatus in contact with the head. For example, the sensor may be provided on a portion of the head-mounted display apparatus in contact with the head and detect the contact pressure of the portion on the head.

The sensor detecting the contact pressure may be, for example, a sensor detecting a push. The sensor detecting a push may be, for example, a sensor optically detecting a push, a sensor detecting a push on the basis of electrostatic capacity, or a sensor magnetically detecting a push. However, the sensor should not be limited to these sensors.

The sensor optically detecting a push may be a sensor detecting a push on the basis of the amount of light or a sensor detecting a push on the basis of a change in detection position of light, for example.

An example of the sensor detecting a push on the basis of the amount of light is described below with reference to FIG. 3. FIG. 3 illustrates a sensor 30 including a light source 31, a light amount detector 32, a light amount limiter 33, and a spring 34. The light source 31 may be a light source radially outputting light. The light source 31 may be an LED, for example. The light amount detector 32 may be a photodiode, for example. The light amount limiter 33 may be a plate member provided with a pinhole 35. The light amount limiter 33 is configured so that light outputted from the light source 31 passes through the pinhole 35 and reaches the light amount detector 32.

The light source 31 is held by a light source holding case 36. The light amount detector 32 and the light amount limiter 33 are held by a light amount detector holding case 37. The light source holding case 36 and the light amount detector holding case 37 are coupled by the spring 34. The light amount detector 32 and the light amount limiter 33 are fixed to the light amount detector holding case 37, and the positional relationship between the light amount detector 32 and the light amount limiter 33 (in particular, the pinhole 35) is fixed. In contrast, the positional relationship between the light source 31 and the light amount detector 32 is not fixed. For example, when the light amount detector holding case 37 is pushed toward the light source holding case 36, the spring 34 shrinks and the light amount detector 32 is brought closer to the light source 31. When the pushing is released, the spring 34 expands and the light amount detector 32 is brought away from the light source 31.

When the light amount detector holding case 37 is pushed as illustrated in A of FIG. 3, for example, the light amount detector holding case 37 is brought closer to the light source 31, which brings the light amount limiter 33 and the pinhole 35 closer to the light source 31. As the pinhole 35 is brought closer to the light source 31, the amount of light detected by the light amount detector 32 increases. When the pushing is partially released, the spring 34 expands into a state illustrated in B of FIG. 3, for example. As the pinhole 35 is brought away from the light source 31 in the state illustrated in B of FIG. 3, the amount of light detected by the light amount detector 32 decreases comparing with the case illustrated in A of FIG. 3. When the pushing is completely released, the spring 34 further expands into a state illustrated in C of FIG. 3, for example. As the pinhole 35 is further brought away from the light source 31 in the state illustrated in C of FIG. 3, the amount of light detected by the light amount detector 32 decreases comparing with the case illustrated in B of FIG. 3. As described above, the amount of light detected by the light amount detector 32 and the distance between the light amount detector holding case 37 and the light source holding case 36 have a predetermined relationship illustrated by a graph at a bottom part of FIG. 3, for example. As the distance changes depending on the push, the sensor 30 according to the technology may be a sensor that detects a push on the basis of a change in amount of light.

An example of the sensor detecting a push on the basis of the detection position of light is described below with reference to FIG. 4. A sensor 40 illustrated in FIG. 4 includes a light source 41, a light detector 42, a mirror 43, and a spring 44. The light source 41 may be a light source outputting light with high directivity. For example, the light source 41 may be a semiconductor laser (LD). The light detector 42 may be a detector configured to detect a position where the light reaches. For example, the light detector 42 may be a position sensing detector.

The light source 41 may be held by a light source holding case 46. Additionally, the light detector 42 is also held by the light source holding case 46 via a partition 45. The light detector 42 is provided at a position where the light outputted from the light source 41 and reflected by the mirror 43 reaches. The mirror 43 is held by a mirror holding case 47. The light source holding case 46 and the mirror holding case 47 are coupled by a spring 44. The light source 41 and the light detector 42 are fixed to the light source holding case 46, and the positional relationship between the light source 41 and the light detector 42 is fixed. In contrast, the positional relationship between the light source 41 and the mirror 43 is not fixed. For example, when the mirror holding case 47 is pushed toward the light source holding case 46, the spring 44 shrinks and the mirror 43 is brought closer to the light source 41. When the pushing is released, the spring 44 expands, and the mirror 43 is brought away from the light source 41.

When the mirror holding case 47 is pushed as illustrated in A of FIG. 4, for example, the mirror holding case 47 is brought closer to the light source 41, which brings the mirror 43 closer to the light source 41. As the mirror 43 is brought closer to the light source 41, the reaching position of the light detected by the light detector 42 is brought closer to the light source 41. When the pushing is partially released, the spring 44 expands into a state illustrated in B of FIG. 4, for example. As the mirror 43 is brought away from the light source 41 in the state illustrated in B of FIG. 4, the position of light detected by the light detector 42 is brought away from the light source 41 compared with the case illustrated in A of FIG. 4. When the pushing is completely released, the spring 44 further expands into a state illustrated in C of FIG. 4, for example. As the mirror 43 is further brought away from the light source 41 in the state illustrated in C of FIG. 4, the position of light detected by the light detector 42 is brought away from the light source 41 compared with the case illustrated in B of FIG. 4. As described above, the position of light detected by the light detector 42 and the distance between the mirror holding case 47 and the light source holding case 46 have a predetermined relationship illustrated by a graph at a bottom part of FIG. 4, for example. As the distance changes depending on the push, the sensor 40 according to the technology may be a sensor that detects a push on the basis of a change in detection position of light.

The sensor according to the technology that detects a push on the basis of electrostatic capacity may include a deformable conductor layer and an electrode substrate that detects deformation of the conductor layer, for example. The deformation is detected on the basis of a change in electrostatic capacity. The sensor may have a sheet shape, for example. Examples of such a sensor may include a sensor device described in Japanese Unexamined Patent Application Publication No. 2014-179620, for example. The sensor device includes a first deformable conductor layer having a sheet shape, a second conductor layer opposed to the first conductor layer, and an electrode substrate provided between the first and second conductor layers in a deformable manner. The relative distance between the first conductor layer and the electrode substrate and the relative distance between the second conductor layer and the electrode substrate are changed when the sensor device is pushed on the first conductor layer, and the push is electrostatically detected on the basis of the changes in distance.

The sensor according to the technology that detects a push on the basis of electrostatic capacity should not be limited to the sensor device described above, and may have another configuration.

The sensor according to the technology that magnetically detects a push may be a sensor utilizing a hole effect, for example. The sensor may include, for example, a hole element and a magnet. The voltage outputted from the hole element changes depending on the positional relationship between the hole element and the magnet.

The sensor according to the technology that detects the change in position of the head-mounted display apparatus relative to the head may be, for example, a sensor that detects a change in two-dimensional position, more preferably, a sensor that detects a change in three-dimensional position. For example, the sensor that detects a change in the head-mounted display apparatus relative to the head may be, for example, a combination of sensors that detect a change in two-dimensional or three-dimensional position or a single sensor that detects a change in two-dimensional or three-dimensional position.

For example, in the case of a single sensor detecting the change in position of the head-mounted display apparatus relative to the head in one axial direction, two or three of the sensors are combined to detect the change in two-dimensional or three-dimensional position. For example, the sensor illustrated in FIGS. 3 and 4 is a single sensor that detects the change in position in one axial direction. A combination of two or more of the sensors enables detection of the change in two-dimensional or three-dimensional position.

Alternatively, in the case of a single sensor detecting the change in position of the head-mounted display apparatus relative to the head in two or three axial directions, it possible to detect a change in two-dimensional or three-dimensional position by the single sensor. As the sensor detecting the change in two or three axial directions, a sensor commercially available or a sensor known in the field of the technology may be used. Examples of the sensor may include a Shokac Pot (available from Touchence Inc.), for example.

Although the sensor illustrated in FIG. 1 is provided on a portion in contact with the head, the sensor according to the technology that detects the change in position of the head-mounted display apparatus relative to the head may be provided on a portion of the head-mounted display apparatus not in contact with the head. For example, the sensor may be provided on a portion of the head-mounted display apparatus not in contact with the head and detect the change in position of the portion relative to a head reference position.

The head reference position may be a feature position present on the surface of the head, for example. The feature position may be set on the basis of an image of the surface of the head, for example. For example, the feature position may be set in a region including a mole, a spot, hair, asperity, or a predetermined color portion (e.g., a pattern on the skin surface), for example. Alternatively, the feature position may be set in a region having a predetermined color. Examples of the region having a predetermined color may be the inner corner or the outer corner of the eye, for example.

Examples of the sensor provided on the portion not in contact with the head (hereinafter also referred to as a "non-contact sensor") may be a ranging sensor, in particular, a TOF sensor, for example. The ranging sensor may measure the distance between the head reference position and the ranging sensor, and a change in the measured distance may be used as the change in position of the head relative to the head-mounted display apparatus.

The non-contact sensor may be, for example, an image sensor, in particular, a CMOS or a CCD. On the basis of a change in the head reference position in the image of the head surface captured by the image sensor, the change in position of the head relative to the head-mounted display apparatus may be detected. When the image sensor is used, the change in position of the head relative to the head-mounted display apparatus may be detected on the basis of a change in angle and/or distance between two or more feature points in the image of the head surface or a change in image magnification such as an angle and/or distance between two or more feature points, for example.

(4) Exemplary Configuration of Head-Mounted Display Apparatus

An exemplary configuration of the head-mounted display apparatus according to the technology is described below with reference to FIG. 10.

A head-mounted display apparatus 1000 illustrated in FIG. 10 includes a central processing unit (CPU) 1001, a RAM 1002, and a ROM 1003. The CPU 1001, the RAM 1002, and the ROM 1003 are coupled to each other via a bus 1004. Additionally, an input-output interface 1005 is coupled to the bus 1004.

To the input-output interface 1005, a communication device 1006, a storage 1007, a drive 1008, an output unit 1009, and an input unit 1010 are coupled.

The communication device 1006 couples the head-mounted display apparatus 1000 to a network 1011 via a wired or wireless communication. The head-mounted display apparatus 1000 is configured to cause the communication device 1006 to acquire various kinds of data (e.g., image data) via the network 1010. The acquired data may be stored in a disk 1007, for example. The type of the communication device 1006 may be appropriately selected by a person skilled in the art.

The storage 1007 may store an operating system (e.g., WINDOWS (registered trademark), UNIX (registered trademark), LINUX (registered trademark), ANDROID (registered trademark), or iOS (registered trademark)), programs for causing the head-mounted display apparatus to implement an image display method according to the technology, other types of programs, image data, sound data, various kinds of data (e.g., a correction table) to be used in the image display method according to the technology, and other types of data.

The drive 1008 may read the data (e.g., image data or sound data) or the program stored in a storage medium and output the data or the program to the RAM 1003. The storage medium may be, for example, a micro SD memory card, an SD memory card, or a flash memory. However, the storage medium should not be limited to these examples.

The output unit 1009 causes the image display unit to output the image display light on the basis of the image data. Additionally, the output unit 1009 may cause a sound output device such as speaker or a headphone to output a sound on the basis of sound data, for example. The input unit 1010 receives an operation performed by the user on the head-mounted display apparatus, for example.

2. Second Embodiment (Image Display System)

The technology also provides an information display system including a head-mounted display apparatus and an image processor. The head-mounted display apparatus includes a sensor that detects the change in position of the head-mounted display apparatus relative to the head. The image processor sends image data to the head-mounted display apparatus.

The head-mounted display apparatus has the configuration described in first embodiment 1 above, and the description is applicable to the present embodiment.

The information processor only has to be able to send image data to the head-mounted display apparatus. For example, the information processor may be a smartphone, a personal computer, or a server. The information processor may include a communication device and a storage in addition to a CPU, a RAM, and a ROM.

The information processor transmits the image data or the image data and the sound data stored in the storage to the head-mounted display apparatus using a communication device. The transmission may be performed through a wired or wireless communication via a network or without a network, for example.

The head-mounted display apparatus receives the image data or the image data and the sound data using the communication device. These data may be stored in the storage of the head-mounted display apparatus, for example. The head-mounted display apparatus may output the image display light on the basis of these data.

3. Third Embodiment (Image Display Method)

The technology also provides an image display method including a detection step of detecting the change in position of the head-mounted display apparatus relative to the head, and an adjustment step of adjusting a position to which the head-mounted display apparatus projects image display light on the basis of the change in position detected in the detection step.

Since the image display method according to the technology includes the detection step, it is possible to detect the mounting deviation. Since the image display method according to the technology further includes the adjustment step, it is possible to adjust a position where the image display light is displayed on the basis of the mounting deviation.

The detection step and the adjustment step may be performed while the head-mounted display apparatus is providing an image to a user wearing the head-mounted display apparatus. This configuration makes it possible to adjust the position to which the image display light is projected on the basis of the mounting deviation generated while the head-mounted display apparatus is providing an image.

The image display method according to the technology may be performed by the head-mounted display apparatus 100 according to the technology, for example. The detection step may be performed by the sensor 104 of the head-mounted display apparatus 100, for example. The adjustment step may be performed by the projection position adjustment mechanism 105. Accordingly, the description of the head-mounted display apparatus 100 described in first embodiment 1 above, in particular, the description of the sensor 104 and the projection position adjustment mechanism 105 described in first embodiment 1 above is applicable to the image display method according to the technology and the detection step and the adjustment step included in the image display method.

The flow of the image display method according to the technology is as in the description in (2-6) of first embodiment 1 with reference to FIG. 9. Steps S102 and S103, in particular, Step S103 in the flowchart in FIG. 9 corresponds to the detection step described above. Step S104 corresponds to the adjustment step described above. Accordingly, the descriptions of these steps are applicable to the detection step and the adjustment step described above.

It is to be noted that the technology may include the following configurations.

[1] A head-mounted display apparatus comprising a sensor that detects a change in position of the head-mounted display apparatus relative to a head.

[2] The head-mounted display apparatus according to [1], in which the sensor does not detect a reference axis of an eyeball of a user wearing the head-mounted display apparatus.

[3] The head-mounted display apparatus according to [1] or [2], in which the sensor detects the change in position of the head-mounted display apparatus on the basis of a change in position of a portion where the sensor is provided relative to the head.

[4] The head-mounted display apparatus according to any one of [1] to [3], in which the head-mounted display apparatus changes a projection position to which the head-mounted display apparatus projects image display light on the basis of the change in position detected by the sensor.

[5] The head-mounted display apparatus according to any one of [1] to [4], in which the sensor is provided on a portion of the head-mounted display apparatus in contact with the head.

[6] The head-mounted display apparatus according to any one of [1] to [4], in which the sensor is provided on a portion of the head-mounted display apparatus in contact with the head, and detects a contact pressure of the portion on the head.

[7] The head-mounted display apparatus according to any one of [1] to [4], in which the sensor is provided on a portion of the head-mounted display apparatus not in contact with the head.

[8] The head-mounted display apparatus according to any one of [1] to [4], in which the sensor is provided on a portion of the head-mounted display apparatus not in contact with the head, and detects a change in position of the portion relative to a head reference position.

[9] The head-mounted display apparatus according to any one of [1] to [8], in which the head-mounted display apparatus corrects an image on the basis of the change in position detected by the sensor.

[10] The head-mounted display apparatus according to any one of [1] to [9], further including an image display unit, in which the image display unit is configured to collect image display light at or near a pupil and irradiate a retina with the image display light to provide a Maxwellian view.

[11] The head-mounted display apparatus according to any one of [1] to [10], in which the head-mounted display apparatus is configured to project image display light to both eyes of the user.

[12] The head-mounted display apparatus according to any one of [1] to [11], in which the head-mounted display apparatus further includes a line of sight detector that detects a line of sight of a user.

[13] The head-mounted display apparatus according to [12], in which the line of sight detector is a photodiode line-of-sight detector or an imaging line-of-sight detector.

[14] The head-mounted display apparatus according to any one of [1] to [3], in which the head-mounted display apparatus further includes a projection position adjustment mechanism that adjusts a projection position of image display light emitted from the head-mounted display apparatus.

[15] The head-mounted display apparatus according to [14], in which the projection position adjustment mechanism adjusts the projection position of the image display light following a line of sight.

[16] The head-mounted display apparatus according to any one of [1] to [15], having a binocular-glasses-like shape, a monocular-glasses-like shape, a goggle-like shape, or a helmet-like shape.

[17] An image display system including:
  a head-mounted display apparatus including a sensor that detects a change in position of the head-mounted display apparatus relative to a head; and
  an information processor that sends image data to the head-mounted display apparatus.

[18] A image display method including:
  a detection step of detecting a change in position of the head-mounted display apparatus relative to a head; and
  an adjustment step of adjusting a position to which the head-mounted display apparatus projects image display light on the basis of the change in position detected in the detection step.

REFERENCE SIGNS LIST

100 head-mounted display apparatus
101 light source
102 projection optical system
103 HOE
104 displacement sensor
105 projection position adjustment mechanism

The invention claimed is:

1. A head-mounted display apparatus, comprising:
  a sensor configured to detect a change in a position of the head-mounted display apparatus with respect to a head of a user;
  a rim portion;
  an inner rim portion held by the rim portion;
  a holographic optical element configured to diffract an image display light, wherein the holographic optical element is held by the inner rim portion; and
  a projection position adjustment mechanism configured to adjust a position of the holographic optical element, wherein the position of the holographic optical element is adjusted based on:
    the detected change in the position of the head-mounted display apparatus; and
    movement of the rim portion and the inner rim portion, by the projection position adjustment mechanism.

2. The head-mounted display apparatus according to claim 1, wherein:
  the sensor does not detect a reference axis of an eyeball of the user; and
  the head-mounted display apparatus is wearable by the user.

3. The head-mounted display apparatus according to claim 1, wherein:
  the sensor is further configured to detect the change in the position of the head-mounted display apparatus based on a change in a position of a portion with respect to the head of the user; and
  the portion corresponds to a portion of the head-mounted display apparatus corresponding to the sensor.

4. The head-mounted display apparatus according to claim 1, wherein the head-mounted display apparatus is further configured to change a projection position to which the head-mounted display apparatus projects the image display light based on the detected change in the position.

5. The head-mounted display apparatus according to claim 1, wherein the sensor is on a portion of the head-mounted display apparatus in contact with the head.

6. The head-mounted display apparatus according to claim 1, wherein:
  the sensor is on a portion of the head-mounted display apparatus in contact with the head; and
  the sensor is further configured to detect a contact pressure of the portion on the head.

7. The head-mounted display apparatus according to claim 1, wherein the sensor is on a portion of the head-mounted display apparatus not in contact with the head.

8. The head-mounted display apparatus according to claim 1, wherein:
  the sensor is on a portion of the head-mounted display apparatus not in contact with the head; and
  the sensor is further configured to detect a change in a position of the portion with respect to a head reference position.

9. The head-mounted display apparatus according to claim 1, wherein the head-mounted display apparatus is further configured to correct an image based on the detected change in the position.

10. The head-mounted display apparatus according to claim 1, further comprising an image display unit configured to:
  collect the image display light at or near a pupil of the user; and
  irradiate a retina of the user with the image display light to provide a Maxwellian view.

11. The head-mounted display apparatus according to claim 1, wherein the head-mounted display apparatus is further configured to project the image display light to both eyes of the user.

12. The head-mounted display apparatus according to claim 1, wherein the head-mounted display apparatus further comprises a line-of-sight detector configured to detect a line of sight of the user.

13. The head-mounted display apparatus according to claim 12, wherein the line-of-sight detector comprises one of a photodiode line-of-sight detector or an imaging line-of-sight detector.

14. The head-mounted display apparatus according to claim 1, wherein:
  the head-mounted display apparatus is further configured to emit the image display light; and the projection position adjustment mechanism is further configured to adjust a projection position of the emitted image display light.

15. The head-mounted display apparatus according to claim 14, wherein the projection position adjustment mechanism is further configured to adjust the projection position of the image display light based on a line of sight of the user.

16. The head-mounted display apparatus according to claim 1, wherein the head-mounted display apparatus has one of a binocular-glasses-like shape, a monocular-glasses-like shape, a goggle-like shape, or a helmet-like shape.

17. The head-mounted display apparatus according to claim 1, wherein
the projection position adjustment mechanism is configured to adjust the position of the holographic optical element based on the movement of the rim portion in a first direction and the movement of the inner rim portion in a second direction different from the first direction.

18. An image display system, comprising:
a head-mounted display apparatus including:
   a sensor configured to detect a change in a position of the head-mounted display apparatus with respect to a head of a user;
   a rim portion;
   an inner rim portion held by the rim portion;
   a holographic optical element configured to diffract an image display light, wherein the holographic optical element is held by the inner rim portion; and
   a projection position adjustment mechanism configured to adjust a position of the holographic optical element, wherein the position of the holographic optical element is adjusted based on:
      the detected change in the position of the head-mounted display apparatus; and
      movement of the rim portion and the inner rim portion, by the projection position adjustment mechanism; and
an information processor configured to transmit image data to the head-mounted display apparatus.

19. An image display method, comprising:
detecting, by a sensor, a change in a position of a head-mounted display apparatus with respect to a head of a user, wherein the head-mounted display apparatus comprises a rim portion and an inner rim portion held by the rim portion;
diffracting, by a holographic optical element, an image display light, wherein the holographic optical element is held by the inner rim portion; and
adjusting, by a projection position adjustment mechanism, a position of the holographic optical element, wherein the position of the holographic optical element is adjusted based on:
   the detected change in the position of the head-mounted display apparatus; and
   movement of the rim portion and the inner rim portion, by the projection position adjustment mechanism.

* * * * *